(12) United States Patent
Yanagita

(10) Patent No.: US 12,337,480 B2
(45) Date of Patent: Jun. 24, 2025

(54) ROBOT CONTROL SYSTEM

(71) Applicant: FANUC CORPORATION, Yamanashi (JP)

(72) Inventor: Akihiro Yanagita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 243 days.

(21) Appl. No.: 18/002,453

(22) PCT Filed: Jul. 7, 2021

(86) PCT No.: PCT/JP2021/025652
§ 371 (c)(1),
(2) Date: Dec. 19, 2022

(87) PCT Pub. No.: WO2022/014444
PCT Pub. Date: Jan. 20, 2022

(65) Prior Publication Data
US 2023/0256599 A1  Aug. 17, 2023

(30) Foreign Application Priority Data
Jul. 14, 2020 (JP) ................................ 2020-120851

(51) Int. Cl.
*B25J 9/16* (2006.01)
*B25J 13/06* (2006.01)

(52) U.S. Cl.
CPC ............ *B25J 9/1656* (2013.01); *B25J 13/06* (2013.01)

(58) Field of Classification Search
CPC ................................ B25J 9/1656; B25J 13/06
See application file for complete search history.

(56) References Cited

U.S. PATENT DOCUMENTS 9,717,607 B1 *  8/2017  Bostick ..................... A61F 2/54
9,965,599 B2 *  5/2018  Komatsu ............... G06F 21/105
(Continued)

FOREIGN PATENT DOCUMENTS

CN    109483536 A    3/2019
JP    2000-125246 A  4/2000
(Continued)

OTHER PUBLICATIONS

International Search Report issued in PCT/JP2021/025652; mailed Sep. 28, 2021.

*Primary Examiner* — Sze-Hon Kong
(74) *Attorney, Agent, or Firm* — Studebaker Brackett PLLC

(57) ABSTRACT

Provided is a robot control system that can appropriately perform addition and deletion of new functions. This robot control system is provided with: a robot control device; and a teaching manipulation panel. The robot control device is provided with: a storage unit; a function addition unit; a switching unit that is provided on the teaching manipulation panel and that is for setting the operation of the function addition unit to be enabled or disabled; and a function control unit that, when the operation of the function addition unit is set to be enabled by the switching unit, enables addition and deletion of a function by the function addition unit, and when the operation of the function addition unit is set to be disabled by the switching unit, disables the addition and deletion of a function by the function addition unit.

9 Claims, 3 Drawing Sheets

(56) References Cited

U.S. PATENT DOCUMENTS

| | | | |
|---|---|---|---|
| 11,331,798 B2* | 5/2022 | Tan | B25J 9/0081 |
| 11,749,134 B2* | 9/2023 | Jeong | A63H 33/26 |
| 2003/0074107 A1* | 4/2003 | Noma | G06N 3/126 |
| | | | 700/245 |
| 2004/0260426 A1* | 12/2004 | Johannessen | B25J 13/06 |
| | | | 700/245 |
| 2006/0178778 A1* | 8/2006 | Fuhlbrigge | G05B 19/0426 |
| | | | 700/264 |
| 2013/0218339 A1* | 8/2013 | Maisonnier | B25J 13/003 |
| | | | 700/257 |
| 2014/0188281 A1* | 7/2014 | Nagai | B25J 9/0081 |
| | | | 700/264 |
| 2014/0316566 A1* | 10/2014 | Mazel | G06N 3/008 |
| | | | 700/250 |
| 2015/0127124 A1* | 5/2015 | Kobayashi | G05B 19/409 |
| | | | 700/83 |
| 2016/0297067 A1* | 10/2016 | Kogan | B25J 13/06 |
| 2016/0364367 A1* | 12/2016 | Takayama | G06F 3/04883 |
| 2017/0076194 A1* | 3/2017 | Versace | G06N 3/02 |
| 2017/0291295 A1* | 10/2017 | Gupta | G09B 19/0053 |
| 2017/0320211 A1* | 11/2017 | Akan | G06F 8/34 |
| 2018/0178380 A1* | 6/2018 | Oestergaard | B25J 9/1656 |
| 2018/0290299 A1* | 10/2018 | Kawaguchi | G05B 19/425 |
| 2018/0370030 A1* | 12/2018 | Sedlmayr | B25J 9/1656 |
| 2019/0126489 A1* | 5/2019 | Wada | B25J 9/163 |
| 2019/0132399 A1* | 5/2019 | Henning | H04L 63/10 |
| 2019/0160686 A1* | 5/2019 | Riedel | G06F 3/04883 |
| 2019/0202058 A1* | 7/2019 | Dai | B25J 9/1671 |
| 2019/0227775 A1* | 7/2019 | Kim | G09B 1/325 |
| 2020/0290210 A1* | 9/2020 | Ha | B25J 11/008 |
| 2021/0182368 A1* | 6/2021 | Nakamura | G05B 19/409 |
| 2022/0076587 A1* | 3/2022 | Murphy | G09B 5/06 |

FOREIGN PATENT DOCUMENTS

| | | |
|---|---|---|
| JP | 2015-056161 A | 3/2015 |
| JP | 2015-150636 A | 8/2015 |
| JP | 2016-059982 A | 4/2016 |
| JP | 2019-028518 A | 2/2019 |

* cited by examiner

ROBOT CONTROL SYSTEM

TECHNICAL FIELD

The present invention relates to a robot control system.

BACKGROUND ART

A robot controller has conventionally used system software to control a robot. The system software is stored in a storage unit such as memory in the robot controller (for example, see Japanese Unexamined Patent Application, Publication No. 2015-150636).

Patent Document 1: Japanese Unexamined Patent Application, Publication No. 2015-150636

DISCLOSURE OF THE INVENTION

Problems to Be Solved By the Invention

In the case where a new function is added to existing system software for the robot controller, when the new function is added during automatic operation of the robot, software configuration and setting information for the robot are changed, which may adversely affect motion of the robot in operation. Therefore, it has been required to appropriately add the new function.

Means for Solving the Problems

A robot control system according to the present disclosure includes a robot controller that controls a robot, and a teach pendant that is connected with the robot controller and that is operated by an operator, wherein the robot controller includes a storage unit configured to store system software for the robot controller, a function adding unit configured to add and delete a function to and from the system software, a switching unit that is provided on the teach pendant and that is used to set operation of the function adding unit to be enabled or disabled, and a function control unit that, when the operation of the function adding unit is set to be enabled by the switching unit, enables addition and deletion of a function by the function adding unit, and when the operation of the function adding unit is set to be disabled by the switching unit, disables the addition and deletion of a function by the function adding unit.

Effects of the Invention

The present invention makes it possible to appropriately add and delete a new function.

PREFERRED MODE FOR CARRYING OUT THE INVENTION

Figure 1:
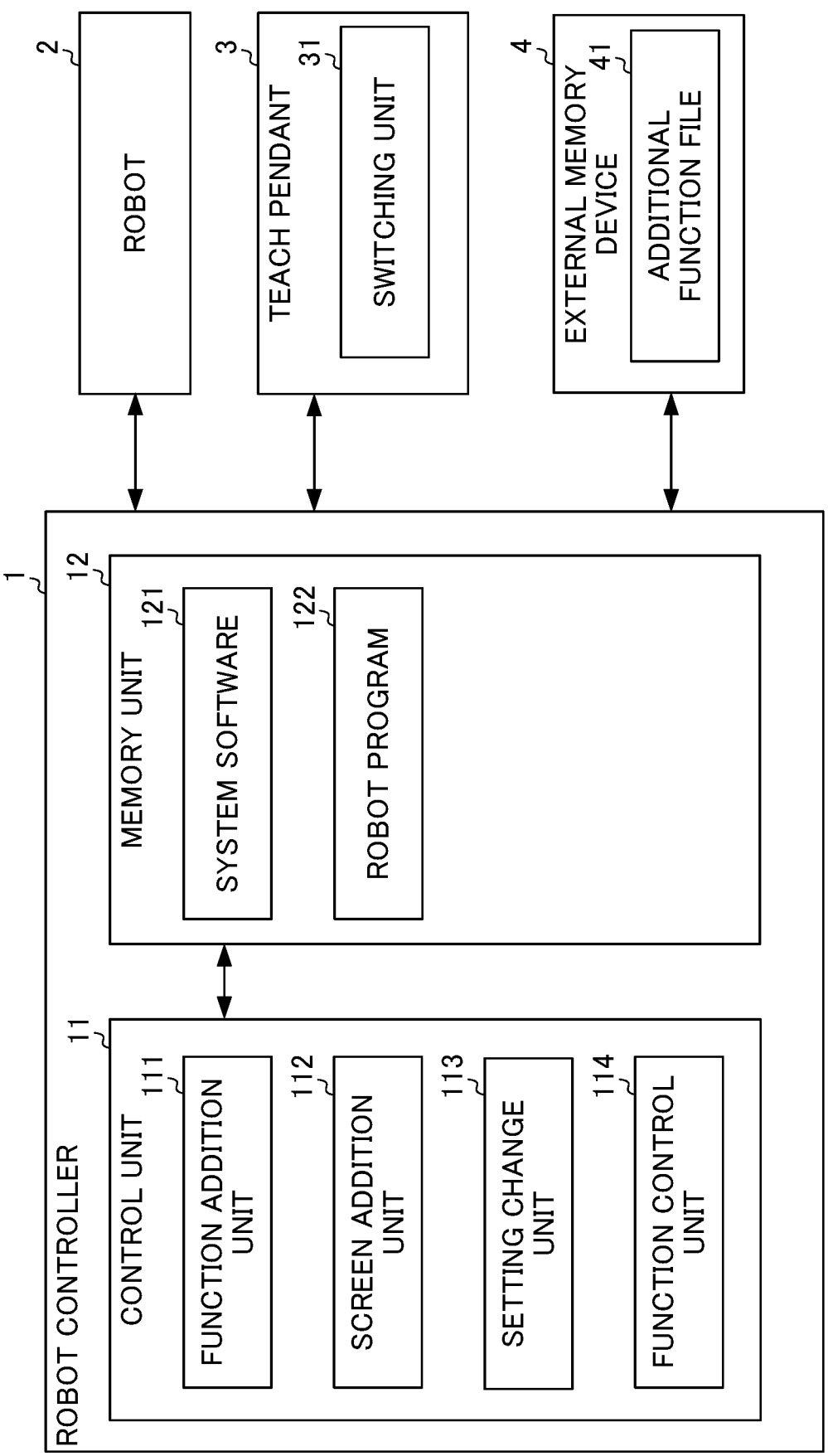
FIG. 1 is a block diagram showing a configuration of a robot control system according to the present embodiment.

Hereinafter, an example of an embodiment of the present invention will be described. FIG. 1 is a block diagram showing a configuration of a robot control system 100 according to the present embodiment. The robot control system 100 includes a robot controller 1, a robot 2, a teach pendant 3, and an external memory device 4. The robot controller 1 is connected to the robot 2 and executes various types of processing to control the robot 2.

The robot 2 is connected to the robot controller 1, and operates according to control by the robot controller 1.

The teach pendant 3 is a display-and-input device that includes a display and a hardware key, for example. The teach pendant 3 is connected to the robot controller 1, and an operator operates the teach pendant 3 to execute creation, correction, and registration of a robot program to set various types of parameters, to run a taught robot program, and to perform manual operations for robot positioning, for example.

The teach pendant 3 includes a switching unit 31 that is provided on the teach pendant 3 and that is used to set operation of a function adding unit 111 in a control unit 11 (which will be described later) to be enabled or disabled. For example, the switching unit 31 may be a switch or a button capable of being switched between on and off.

The external memory device 4 is a memory device that is connectable to the robot controller 1, such as a USB memory or a CF card. The external memory device 4 includes an additional function file 41, for example.

The robot controller 1 includes the control unit 11, and a storage unit 12. The control unit 11 is a processor such as a central processing unit (CPU). The control unit 11 includes the function adding unit 111, a screen addition unit 112, a setting change unit 113, and a function control unit 114.

The storage unit 12 includes read only memory (ROM), random access memory (RAM), nonvolatile memory, a hard disk drive, and a solid state drive (SSD), for example, to store various types of data.

For example, system software used to control the robot 2 and system software used to perform image processing are stored in the ROM in the storage unit 12. A robot program used to teach work contents of the robot according to an application and its related setting data are stored in the nonvolatile memory in the storage unit 12. The RAM in the storage unit 12 serves as a memory area used to temporarily store data that the control unit 11 uses for various types of arithmetic processing.

System software 121 is system software used to control the robot 2, and serves as a collection of a plurality of system programs. A robot program 122 is a program that causes the robot 2 to execute various types of operations.

The additional function file 41 stored in the external memory device 4 contains files each used to add a function to the system software 121, and the files constitute an archive file that is a single file containing a plurality of system programs and a plurality of data files.

The additional function file 41 contains, for example, function definition information files, additional system software files, opera screen configuration files, operation screen control files, robot program instruction files, setting-purpose data files, and command files.

The function definition information files each contain definition information (name, version edition, ID name, description of function, for example). Each of function definition information files 411 is registered as an entry in an additional function database to be added to the storage unit 12. For example, the function adding unit 111 in the control unit 11 causes the teach pendant 3 for the robot controller 1 to display a list of functions to be added, based on the data in the additional function database.

The additional function file 41 further contains identification information for functions to be added. Therefore, the control unit 11 can discriminate an added function from the other functions.

The additional system software files each are a file that contains a system program using a machine code that the control unit 11 in the robot controller 1 can execute.

The operation screen configuration files and the operation screen control files are files each used to add an operation screen on the teach pendant 3 for the robot controller 1. The operation screen configuration files and the operation screen control files are registered in a screen control database to be added to the storage unit 12.

The robot program instruction files each are a file used to add a new robot instruction. The setting-purpose data files each are a file used to cause the robot controller 1 to change settings for the robot 2. The command files each are a file that contains commands causing the robot controller 1 to perform various types of processing (file operations, and system setting operations, for example).

Next, processing of adding a function by the control unit 11 will be described below.

The function adding unit 111 adds a function to the system software 121 based on the additional function file 41 stored in the external memory device 4.

Alternatively, the function adding unit 111 may selectively add the function to the system software 121 based on the additional function file 41. Specifically, the function adding unit 111 may selectively add the function to the system software 121 by causing the teach pendant 3 to display a list of functions to be added and selecting a certain function through an operation on the teach pendant 3.

The introduction of an additional function is executed through such processing as described below, for example.

(a) The function adding unit 111 deploys the corresponding files contained in the additional function file 41 into the RAM in the storage unit 12.

(b) The function adding unit 111 reads function information (ID name and version edition, for example) from corresponding one of the function definition information files, and secures an area (function introduction area) used to store the additional function in the non-volatile memory in the storage unit 12. In addition, the function adding unit 111 uses the ID name of the additional function as a name of the function introduction area.

(c) The function adding unit 111 copies all the files deployed into the storage unit 12 to the secured function introduction area, and then deletes the deployed files.

(d) The control unit 11 executes processing corresponding to each of the files contained in the additional function file 41.

(e) When the robot controller 1 is started again after all the processing is completed, the robot controller 1 can execute the additional function.

The screen addition unit 112 adds a new graphical user interface (GUI) screen to the system software 121 based on corresponding one of the operation screen configuration files and corresponding one of the operation screen control files. For example, the screen addition unit 112 adds, to the system software 121, a new GUI screen used to operate an additional device 5 based on corresponding one of the operation screen configuration files and corresponding one of the operation screen control files. Therefore, a user can use the teach pendant 3 to operate the additional function.

The setting change unit 113 changes system settings for the system software 121 based on corresponding one of the setting-purpose data files and corresponding one of the command files. For example, the setting change unit 113 changes the system settings for the system software 121 related to the operations of the additional device 5 based on corresponding one of the setting-purpose data files and corresponding one of the command files.

When the operation of the function adding unit 111 is set to be enabled by the switching unit 31, the function control unit 114 enables addition of a function by the function adding unit 111. When the operation of the function adding unit 111 is set to be disabled by the switching unit 31, the function control unit 114 disables the addition of a function by the function adding unit 111. That is, the function adding unit 111 can add the function only when the operation of the function adding unit 111 is set to be enabled.

In the case where the operation of the function adding unit 111 is set to be disabled by the switching unit 31 when an operator uses the teach pendant 3 to display a screen for adding the function in order to add the function, the function control unit 114 causes the teach pendant 3 to display a message that promotes the switching unit 31 to enable the operation of the function adding unit 111.

Then, the function control unit 114 continues to cause the teach pendant 3 to display the message that promotes the switching unit 31 to enable the operation of the function adding unit 111, until the operation of the function adding unit 111 is enabled by the switching unit 31 or the transition to another screen is performed. When the operation of the function adding unit 111 is enabled by the switching unit 31, the function control unit 114 enables the addition of a function by the function adding unit 111.

In the case where the operation of the function adding unit 111 is set to be enabled by the switching unit 31, the function control unit may enable an operation on the teach pendant 3 for selectively adding the function to the system software 121. This enables the robot controller 1 to selectively add the function to the system software 121.

When the operation of the function adding unit 111 is set to be enabled by the switching unit 31 during automatic operation of the robot 2 by the robot controller 1, the function control unit 114 stops the automatic operation of the robot 2 and generates notification information for notifying an abnormality in the settings of the switching unit 31. Specifically, when the operation of the function adding unit 111 is set to be enabled by the switching unit 31 during automatic operation of the robot 2 by the robot controller 1, the function control unit 114 stops the automatic operation of the robot 2 and causes the teach pendant 3 to display an abnormality message as the notification information for notifying an abnormality in the settings of the switching unit 31. In addition, the function control unit 114 may emit an alarm sound as the notification information.

In the state in which the operation of the function adding unit 111 is set to be disabled by The switching unit 31, the function control unit 114 may cause the storage unit 12 to temporarily store the additional function file in the case where the additional function file is present in the external memory device 4. Then, when the operation of the function adding unit 111 is set to be enabled by the switching unit 31, the function adding unit 111 may add the function to the system software 121 based on the additional function file temporarily stored in the storage unit 12.

In the state in which the operation of the function adding unit 111 is set to be disabled by the switching unit 31, the function control unit 114 may cause the storage unit 12 to temporarily store the additional function file in the case where the additional function file is present in the external memory device 4. Then, when the operation of the function adding unit 111 is set to be enabled by the switching unit 31, the function control unit 114 may cause the teach pendant 3 to display execution information for executing addition of a function by the function adding unit 111.

Specifically, when the operation of the function adding unit 111 is set to be enabled by the switching unit 31, the function control unit 114 causes the teach pendant 3 to display, as the execution information, information instructing to start installation of the additional function file. This enables an operator to operate the teach pendant 3 to execute the installation of the additional function file. Then, the function adding unit 111 may add the function to the system software 121 based on the additional function file temporarily stored in the storage unit 12.

Figure 2:
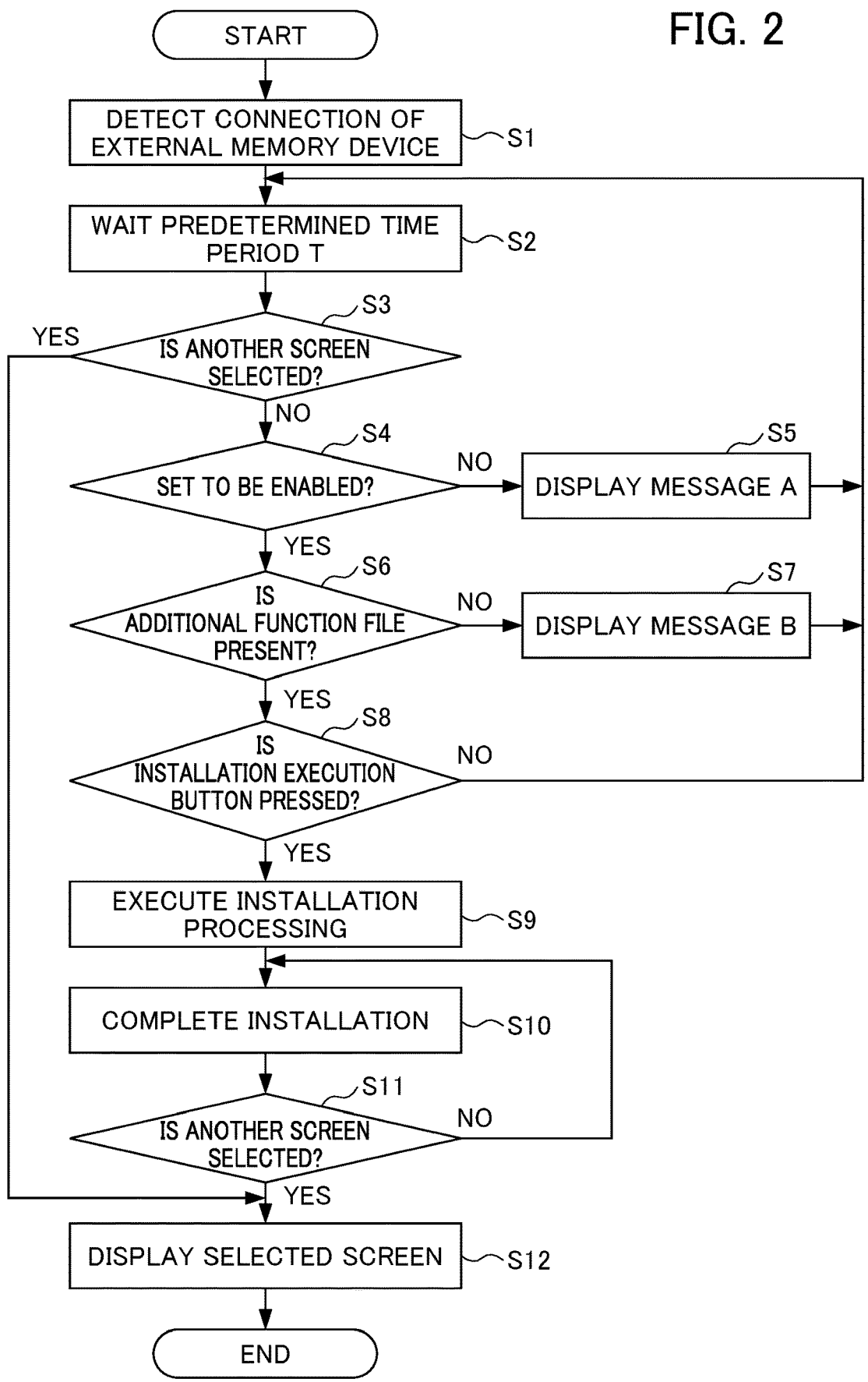
FIG. 2 is a flowchart showing adding processing of a new function in the robot control system according to the present embodiment.

FIG. 2 is a flowchart showing processing of the robot control system 100 according to the present embodiment. In Step S1, the function control unit 114 detects the external memory device 4 being connected to the robot controller 1.

In Step S2, the function control unit 114 waits a predetermined time period T (e.g., 0.1 seconds). In Step S3, the function control unit 114 determines whether another screen other than the screen for adding the function is selected on the teach pendant 3. When another screen is selected (YES), the process moves to Step S12. On the other hand, when the screen for adding the function is selected (NO), the process moves to Step S4.

In Step S4, the function control unit 114 determines whether the operation of the function adding unit 111 is set to be enabled by the switching unit 31. When the operation of the function adding unit 111 is set to be enabled (YES), the process moves to Step S6. On the other hand, when the operation of the function adding unit 111 is set to be disabled (NO), the process moves to Step S5.

In Step S5, the function control unit 114 causes the teach pendant 3 to display a message A that promotes the switching unit 31 to set to enable the operation of the function adding unit 111. For example, in the case where the switching unit 31 is a switch, the function control unit 114 causes the teach pendant 3 to display the message A such as "please turn on the switch" or "the switch is off".

In Step S6, the function control unit 114 enables the addition of a function by the function adding unit 111. Then, the function control unit 114 determines whether an additional function file is present in the external memory device 4. When the additional function file is present (YES), the process moves to Step S8. On the other hand, when no additional function file is present (NO), the process moves to Step S7.

In Step S7, since it is determined in Step S6 that no additional function file is present, the function control unit 114 causes the teach pendant 3 to display a message B that promotes connection of another external memory device 4 in which the additional function file is present. For example, the function control unit 114 causes the teach pendant 3 to display the message B such as "please connect a correct external memory device".

In Step S8, the function control unit 114 determines whether the screen for adding the function is operated on the teach pendant 3. Specifically, the function control unit 114 determines whether an installation execution button is pressed on the teach pendant 3 as an operation on the screen for adding the function. When the installation execution button is pressed (YES), the process moves to Step S9. On the other hand, when the installation execution button is not pressed (NO), the process moves to Step S2.

In Step S9, the function adding unit 111 executes processing of adding (installing) the function to the system software 121 based on the additional function file.

In Step S10, the function control unit 114 causes the teach pendant 3 to display information indicating that the processing of adding (installing) the function has been completed after addition of the function by the function adding unit 111. For example, the function control unit 114 causes the teach pendant 3 to display a message such as "the installation is completed".

In Step S11, the function control unit 114 determines whether another screen other than the screen for adding the function is selected on the teach pendant 3. When another screen is selected (YES), the process moves to Step S12. On the other hand, when the screen for adding the function is selected (NO), the process moves to Step S10.

In Step S12, the function control unit 114 causes the teach pendant 3 to display the screen selected in Step S3 or Step S11.

Next, processing of deleting a function by the control unit 11 will be described below. The function adding unit 111 and the screen addition unit 112 may be configured to be capable of deleting a function after the function was added previously.

The function adding unit 111 may selectively delete the added function. Specifically, the function adding unit 111 may selectively delete the function by causing the teach pendant 3 to display a list of functions added previously and selecting a certain function through an operation on the teach pendant 3.

The deletion of a function is executed through such processing as described below, for example.

(a) The function adding unit 111 can specify a function introduction area in the nonvolatile memory in the storage unit 12 using the ID name of the additional function.

(b) The control unit 11 executes processing on the deletion of each file contained in the additional function file 41.

(c) The function adding unit 111 deletes the files deployed into the function introduction area in the storage unit 12.

(d) The function adding unit deletes the files in the additional function file 41 to be deployed into the RAM in the storage unit 12.

(e) When the robot controller 1 is started again after all the processing is completed, the robot controller 1 enables the deletion of a function.

The screen addition unit 112 deletes a new GUI screen used to operate the additional device 5, the new GUI screen being added to the system software 121 based on corresponding one of the operation screen configuration files and corresponding one of the operation screen control files.

The setting change unit 113 changes system settings for the system software 121 after the function deletion based on corresponding one of the setting-purpose data files and corresponding one of the command files. For example, the setting change unit 113 changes the system settings for the system software 121 related to the operations after the function deletion of the additional device 5 based on each of the setting-purpose data files to be deleted and each of the command files to be deleted.

When the operation of the function adding unit 111 is set to be enabled by the switching unit 31, the function control unit 114 enables deletion of a function by the function adding unit 111. When the operation of the function adding unit 111 is set to be disabled by the switching unit 31, the function control unit 114 disables the deletion of a function by the function adding unit 111. That is, the function adding unit 111 can delete the function only when the operation of the function adding unit 111 is set to be enabled.

In the case where the operation of the function adding unit 111 is set to be disabled by the switching unit 31 when an operator uses the teach pendant 3 to display a screen for deleting the function in order to delete the function, the function control unit 114 causes the teach pendant 3 to display a message that promotes the switching unit 31 to enable the function deletion operation of the function adding unit 111.

Then, the function control unit 114 continues to cause the teach pendant 3 to display the message that promotes the switching unit 31 to enable the operation of the function adding unit 111, until the operation of the function adding unit 111 is enabled by the switching unit 31 or the transition to another screen is performed. When the operation of the function adding unit 111 is enabled by the switching unit 31, the function control unit 114 enables the deletion of a function by the function adding unit 111.

In the case where the operation of the function adding unit 111 is set to be enabled by the switching unit 31, the function control unit may enable an operation on the teach pendant 3 for selectively deleting the function from the system software 121. This enables the robot controller 1 to selectively delete a function added to the system software 121.

When the operation of the function adding unit 111 is set to be enabled by the switching unit 31 during automatic operation of the robot 2 by the robot controller 1, the function control unit 114 stops the automatic operation of the robot 2 and generates notification information for notifying an abnormality in the settings of the switching unit 31.

Specifically, when the operation of the function adding unit 111 is set to be enabled by the switching unit 31 during automatic operation of the robot 2 by the robot controller 1, the function control unit 114 stops the automatic operation of the robot 2 and causes the teach pendant 3 to display an abnormality message as the notification information for notifying an abnormality in the settings of the switching unit 31. In addition, the function control unit 114 may emit an alarm sound as the notification information.

Figure 3:
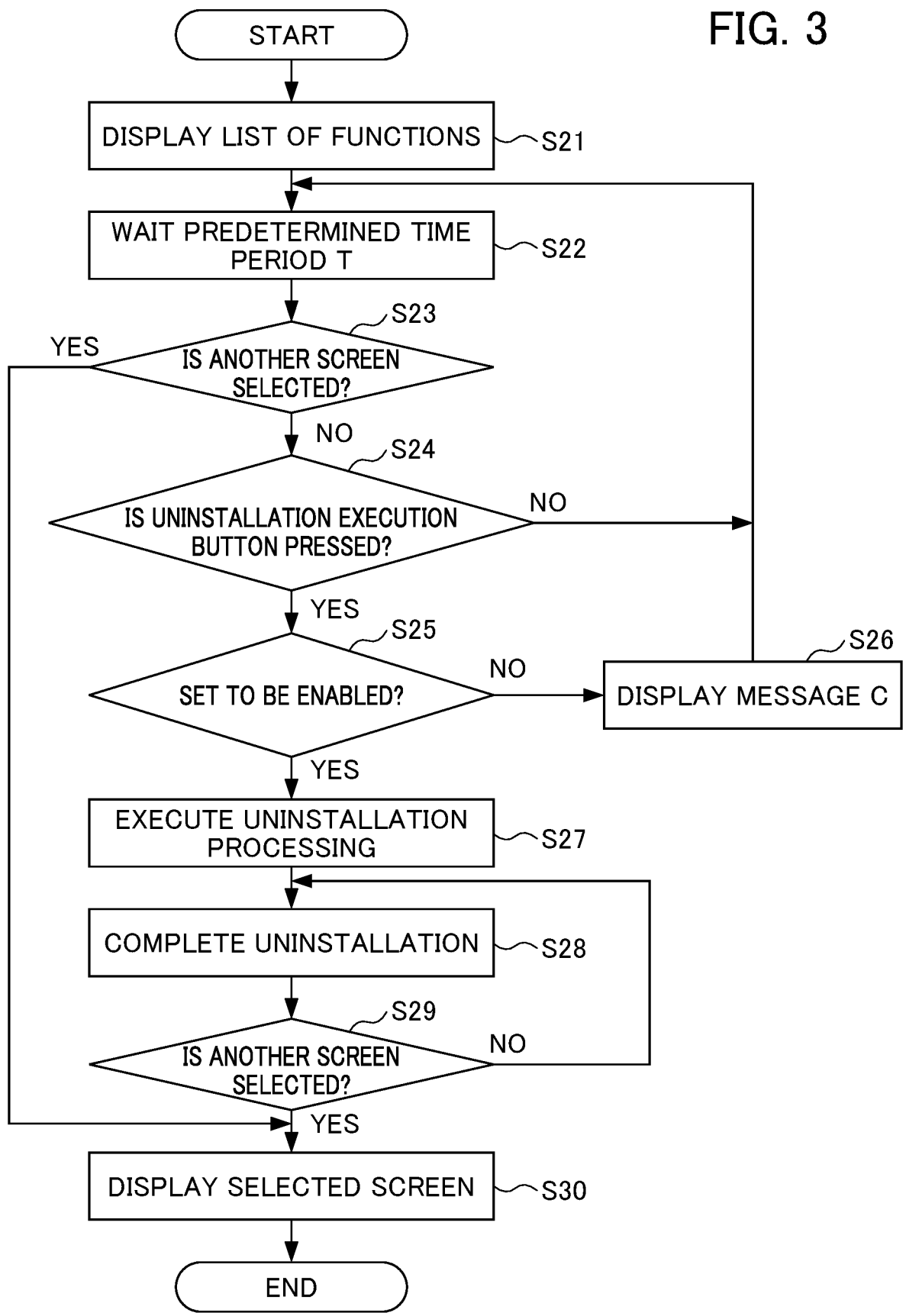
FIG. 3 is a flowchart showing deleting processing of a function added previously in the robot control system according to the present embodiment.

FIG. 3 is a flowchart showing deleting processing of a function of the robot control system 100 according to the present embodiment. In Step S21, the function control unit 114 causes the teach pendant 3 to display a list of functions added previously. In Step S22, the function control unit 114 waits a predetermined time period T (e.g., 0.1 seconds).

In Step S23, the function control unit 114 determines whether another screen other than The screen for deleting the function is selected on the teach pendant 3. When another screen is selected (YES), the process moves to Step S30. On the other hand, when the screen for deleting the function is selected (NO), the process moves to Step S24.

In Step S24, the function control unit 114 determines whether the screen for deleting the function is operated on the teach pendant 3. Specifically, the function control unit 114 determines whether an uninstallation execution button is pressed on the teach pendant 3 as an operation on the screen for deleting the function. When the uninstallation execution button is pressed (YES), the process moves to Step S25. On the other hand, when the uninstallation execution button is not pressed (NO), the process moves to Step S22.

In Step S25, the function control unit 114 determines whether the operation of the function adding unit 111 is set to be enabled by the switching unit 31. When the operation of the function adding unit 111 is set to be enabled (YES), the process moves to Step S27. On the other hand, when the operation of the function adding unit 111 is set to be disabled (NO), the process moves to Step S26.

In Step S26, the function control unit 114 causes the teach pendant 3 to display a message C such as "please turn on the switch" or "the switch is off," and then the process moves to Step S22.

In Step S27, the function adding unit 111 executes the processing of deleting (uninstalling) the function from the system software 121 based on the additional function file.

In Step S28, the function control unit 114 causes the teach pendant 3 to display information indicating that the processing of deleting (uninstalling) the function has been completed after deletion of the function by the function adding unit 111. For example, the function control unit 114 causes the teach pendant 3 to display a message such as "the uninstallation is completed".

In Step S29, the function control unit 114 determines whether another screen other than the screen for deleting the function is selected on the teach pendant 3. When another screen is selected (YES), the process moves to Step S30. On the other hand, when the screen for deleting the function is selected (NO), the process moves to Step S28.

In Step S30, the function control unit 114 causes the teach pendant 3 to display the screen selected in Step S23 or Step S28.

As described above, according to the present embodiment, a robot control system 100 includes a robot controller 1 that controls a robot 2, and a teach pendant 3 that is connected with the robot controller 1 and that is operated by an operator. The robot controller 1 includes a storage unit 12 configured to store system software 121 of the robot controller 1, a function adding unit 111 configured to add a function to the system software 121, a switching unit 31 that is provided on the teach pendant 3 and that is used to set operation of the function adding unit 111 to be enabled or disabled, and a function control unit 114 that, when the operation of the function adding unit 111 is set to be enabled by the switching unit 31, enables addition and deletion of a function by the function adding unit 111, and when the operation of the function adding unit 111 set to be disabled by the switching unit 31, disables the addition and deletion of a function by the function adding unit 111.

In this way, the robot control system 100 uses the switching unit 31 provided on the teach pendant 3 to set the operation of the function adding unit 111 to be enabled and disabled, which makes it possible to appropriately enable and disable addition and deletion of a function to and from the system software 121 by the function adding unit 111. Therefore, the robot control system 100 can appropriately add and delete a new function to and from the system software 121.

The function adding unit 111 adds and deletes a function to and from the system software based on the additional function file stored in the external memory device. This enables the robot control system 100 to appropriately add and delete a function to and from the system software.

The additional function file constitutes an archive file that is a single file containing a plurality of programs and a plurality of data files. This enables the robot control system 100 to preferably introduce a file having an additional function.

The function adding unit 111 selectively adds a function to the system software 121 based on the additional function file 41. This enables the robot control system 100 to appropriately introduce a necessary additional function into the robot controller 1.

When the operation of the function adding unit 111 is set to be enabled by the switching unit 31, the function control unit 114 may enable an operation on the teach pendant 3 for selectively adding a function to the system software 121 or deleting a function added previously. This enables the robot control system 100 to appropriately introduce a necessary additional function into the robot controller 1, and enables the robot control system 100 to appropriately delete a function added previously.

When the operation of the function adding unit 111 is set to be enabled by the switching unit 31 during automatic operation of the robot 2 by the robot controller 1, the function control unit 114 stops the automatic operation and generates notification information for notifying an abnormality in the settings of the switching unit 31. This enables the robot control system 100 to avoid introducing an additional function during automatic operation, which makes it possible to prevent the operation of introducing the additional function from affecting the automatic operation of the robot 2.

In the state in which the operation of the function adding unit 111 is set to be disabled by the switching unit 31, the function control unit 114 causes the storage unit 12 to temporarily store the additional function file 41 in the case where the additional function file 41 is present in the external memory device 4. When the operation of the function adding unit 111 is set to be enabled by the switching unit 31, the function adding unit 111 adds a function to the system software 121 based on the additional function file 41 temporarily stored in the storage unit 12.

This enables the robot control system 100 to add a function to the system software 121 based on the additional function file 41 temporarily stored in the storage unit 12 in the state in which the operation of the function adding unit 111 is set to be disabled.

In the state in which the operation of the function adding unit 111 is set to be disabled by the switching unit 31, the function control unit 114 causes the storage unit 12 to temporarily store the additional function file 41 in the case where the additional function file 41 is present in the external memory device 4. When the operation of the function adding unit 111 is set to be enabled by the switching unit 31, the function control unit 114 causes the teach pendant 3 to display execution information for executing addition of a function by the function adding unit 111.

In this manner, the robot control system 100 causes the teach pendant 3 to display execution information for executing addition of a function by the function adding unit 111. Therefore, an operator refers to the execution information and operates the teach pendant 3, which enables the addition of a function by the function adding unit 111.

Although the embodiment of the present invention has been described, the above-described robot control system 100 can be implemented by hardware, software, or a combination thereof. In addition, a control method to be performed by the above-described robot control system 100 can be implemented by hardware, software, or a combination thereof. Here, the implementation by software means that a computer reads and executes a program for implementation.

The program can be stored in various types of non-transitory computer readable media to be provided to a computer. The non-transitory computer readable media include various types of tangible storage media. Examples of the non-transitory computer readable media include a magnetic recording medium (e.g., a hard disk drive), a magnetic-optical recording medium (e.g., a magnetic optical disk), read only memory (CD-ROM), a CD-R, a CD-R/W, and semiconductor memory (e.g., a mask ROM, a programmable ROM (PROM), an Erasable PROM (EPROM), a flash ROM, random access memory (RAM), and a solid state drive (SSD)).

Although the above-described embodiment represents a preferable embodiment of the present invention, the scope of the present invention should not be limited to only the embodiment described above. Embodiments with various changes without departing from the scope of the present invention are also implementable.

EXPLANATION OF REFERENCE NUMERALS

1 Robot controller
2 Teach pendant
3 Robot
111 Function adding unit
112 Screen addition unit
113 Setting change unit
114 Function control unit

The invention claimed is:

1. A robot control system, comprising:
a robot controller that controls a robot; and
a teach pendant that is connected with the robot controller and that is operated by an operator,
wherein the robot controller includes:
a processor; and
a memory,
wherein the processor is configured to:
store, in the memory, system software for the robot controller; and
add and delete a function to and from the system software,
wherein the robot control system further includes a switching device that is provided on the teach pendant and that is used to set operation of the function for adding or deleting to be enabled or disabled,
wherein the processor is further configured to:
when the operation of the function for adding or deleting is set to be enabled by the switching device, enable addition and deletion of a function;
when the operation of the function for adding or deleting is set to be disabled by the switching device, disable the addition and deletion of a function; and
when the operation of the function for adding or deleting is set to be enabled by the switching device during automatic operation of the robot by the robot controller, stop the automatic operation.

2. The robot control system according to claim 1, wherein the processor adds and deletes a function to and from the system software based on an additional function file stored in an external memory device.

3. The robot control system according to claim 2, wherein the additional function file constitutes an archive file that is a single file containing a plurality of programs and a plurality of data files.

4. The robot control system according to claim 2, wherein the processor selectively adds a function to the system software based on the additional function file.

5. The robot control system according to claim 4, wherein in a case where operation of the function for adding or deleting is set to be enabled by the switching device, the processor enables an operation on the teach pendant for selectively adding the function to the system software.

6. The robot control system according to claim 4, wherein in a case where operation of the function for adding or deleting is set to be enabled by the switching device, the processor enables an operation on the teach pendant for selectively deleting the function from the system software.

7. The robot control system according to claim 1, wherein when stopping the automatic operation, the processor further generates notification information for notifying an abnormality in settings of the switching device.

8. A robot control system, comprising:
a robot controller that controls a robot; and
a teach pendant that is connected with the robot controller and that is operated by an operator,
wherein the robot controller includes:
a processor; and
a memory,
wherein the processor is configured to:
store, in the memory, system software for the robot controller; and
add and delete a function to and from the system software,
wherein the robot control system further includes a switching device that is provided on the teach pendant and that is used to set operation of the function for adding or deleting to be enabled or disabled,
wherein the processor is further configured to:
when the operation of the function for adding or deleting is set to be enabled by the switching device, enable addition and deletion of a function;
when the operation of the function for adding or deleting is set to be disabled by the switching device, disable the addition and deletion of a function; and
add and delete a function to and from the system software based on an additional function file stored in an external memory device;
in a state in which the operation of the function for adding or deleting is set to be disabled by the switching device, cause the memory to temporarily store the additional function file in a case where the additional function file is present in the external memory device; and
when the operation of the function for adding or deleting is set to be enabled by the switching device, add the function to the system software based on the additional function file temporarily stored in the memory.

9. A robot control system, comprising:
a robot controller that controls a robot; and
a teach pendant that is connected with the robot controller and that is operated by an operator,
wherein the robot controller includes:
a processor; and
a memory,
wherein the processor is configured to:
store, in the memory, system software for the robot controller; and
add and delete a function to and from the system software,
wherein the robot control system further includes a switching device that is provided on the teach pendant and that is used to set operation of the function for adding or deleting to be enabled or disabled,
wherein the processor is further configured to:
when the operation of the function for adding or deleting is set to be enabled by the switching device, enable addition and deletion of a function;
when the operation of the function for adding or deleting is set to be disabled by the switching device, disable the addition and deletion of a function; and
add and delete a function to and from the system software based on an additional function file stored in an external memory device;
in a state in which the operation of the function for adding or deleting is set to be disabled by the switching device, cause the memory to temporarily store the additional function file in a case where the additional function file is present in the external memory device, and
when the operation of the function for adding or deleting is set to be enabled by the switching device, cause the teach pendant to display execution information for executing addition of a function.

* * * * *